(12) United States Patent
Aoki et al.

(10) Patent No.: US 6,848,742 B1
(45) Date of Patent: Feb. 1, 2005

(54) SEAT AIR CONDITIONING UNIT FOR VEHICLE AND FAN COMBINATION OF BLOWER UNITS OF THE SAME

(75) Inventors: Shinji Aoki, Chiryu (JP); Toshifumi Kamiya, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/396,097

(22) Filed: Mar. 25, 2003

(30) Foreign Application Priority Data

Mar. 28, 2002 (JP) ..................................... 2002-091315

(51) Int. Cl.[7] .............................................. A47C 31/00
(52) U.S. Cl. .................. 297/180.14; 454/120; 454/907
(58) Field of Search ...................... 297/180, 1, 180.13, 297/180.14, 452.42, 452.43, 452.46, 452.47, 452.49; 454/120, 907; 5/652.1, 652.2, 726, 724, 653

(56) References Cited

U.S. PATENT DOCUMENTS

| | | | | |
|---|---|---|---|---|
| 2,992,604 | A | * | 7/1961 | Trotman et al. ............ 454/120 |
| 4,981,324 | A | * | 1/1991 | Law ....................... 297/180.11 |
| 5,934,748 | A | | 8/1999 | Faust et al. |
| 6,019,420 | A | * | 2/2000 | Faust et al. ............ 297/180.14 |
| 6,059,018 | A | * | 5/2000 | Yoshinori et al. ............. 165/42 |
| 6,179,706 | B1 | * | 1/2001 | Yoshinori et al. ........... 454/120 |
| 6,196,627 | B1 | * | 3/2001 | Faust et al. ............ 297/180.14 |
| 6,224,150 | B1 | | 5/2001 | Eksin et al. |
| 6,578,910 | B2 | * | 6/2003 | Andersson et al. .... 297/180.11 |
| 6,685,553 | B2 | * | 2/2004 | Aoki .......................... 454/120 |

* cited by examiner

Primary Examiner—Peter M. Cuomo
Assistant Examiner—Stephen Vu
(74) Attorney, Agent, or Firm—Harness, Dickey & Pierce, PLC

(57) ABSTRACT

A seat air conditioning unit includes a seat defining an air passage therein through which air flows toward a seat surface, and first and second blower units for blowing air in the air passage. The first blower unit is provided in a seat bottom of the seat and the second blower unit is provided in a backrest of the seat. The first blower unit includes one of a centrifugal fan, a mixed flow fan, and a regeneration fan. The second blower unit includes an axial flow fan.

10 Claims, 4 Drawing Sheets

US 6,848,742 B1

SEAT AIR CONDITIONING UNIT FOR VEHICLE AND FAN COMBINATION OF BLOWER UNITS OF THE SAME

CROSS REFERENCE TO RELATED APPLICATION

This application is based on Japanese Patent Application No. 2002-91315 filed on Mar. 28, 2002, the disclosure of which is incorporated herein by reference.

FIELD OF THE INVENTION

The present invention relates to a seat air-conditioning unit for a vehicle, which supplies conditioned air to a seat of the vehicle.

BACKGROUND OF THE INVENTION

In a seat air conditioning unit for a vehicle disclosed in U.S. Pat. No. 5,934,748, a seat cushion and a backrest of a seat have air passages, heating coil and blower units, respectively. The heating coil and the blower unit are controlled based on temperature determined by a temperature sensor provided at a predetermined position in the seat, thereby optimizing a condition of air in the seat.

Generally, the seat cushion receives pressure from a seat user larger than that the backrest receives. With this, the seat cushion bends larger than the backrest, resulting in an increase in an air flow resistance of the air passage in the seat cushion. In the above seat air conditioning unit, however, the blower units are provided without consideration of difference between air flow resistances of the seat bottom and the backrest.

SUMMARY OF THE INVENTION

It is an object of the present invention to provide a seat air conditioning unit for a vehicle that is capable of improving air conditioning efficiency while saving power consumption.

It is another object of the present invention to provide a seat air conditioning unit with blower units having an effective fan combination.

According to a seat air conditioning unit for a vehicle of the present invention, a seat includes a seat bottom and a backrest, each of which defines an air passage therein. A first blower unit is provided to the seat bottom and blows air into the air passage of the seat bottom. A second blower unit is provided to the backrest and blows air into the air passage of the backrest. The first blower unit includes one of a centrifugal fan, a mixed flow fan and a regenerating fan. The second blower unit includes an axial flow fan.

Because the seat bottom receives a seating pressure from a seat user more than that the backrest receives, the air passage of the seat bottom has an air flow resistance higher than that of the backrest. In the seat bottom, air is supplied by a pressure-type fan such as the centrifugal fan, mixed flow fan and the regenerating fan. On the other hand, in the backrest in which the air flow resistance is lower than that of the seat bottom, air is supplied by an air volume-type fan such as the axial flow fan. Accordingly, a total volume of air to be supplied into the seat is controlled and power required to operation of the fans is saved, thereby improving air conditioning efficiency.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
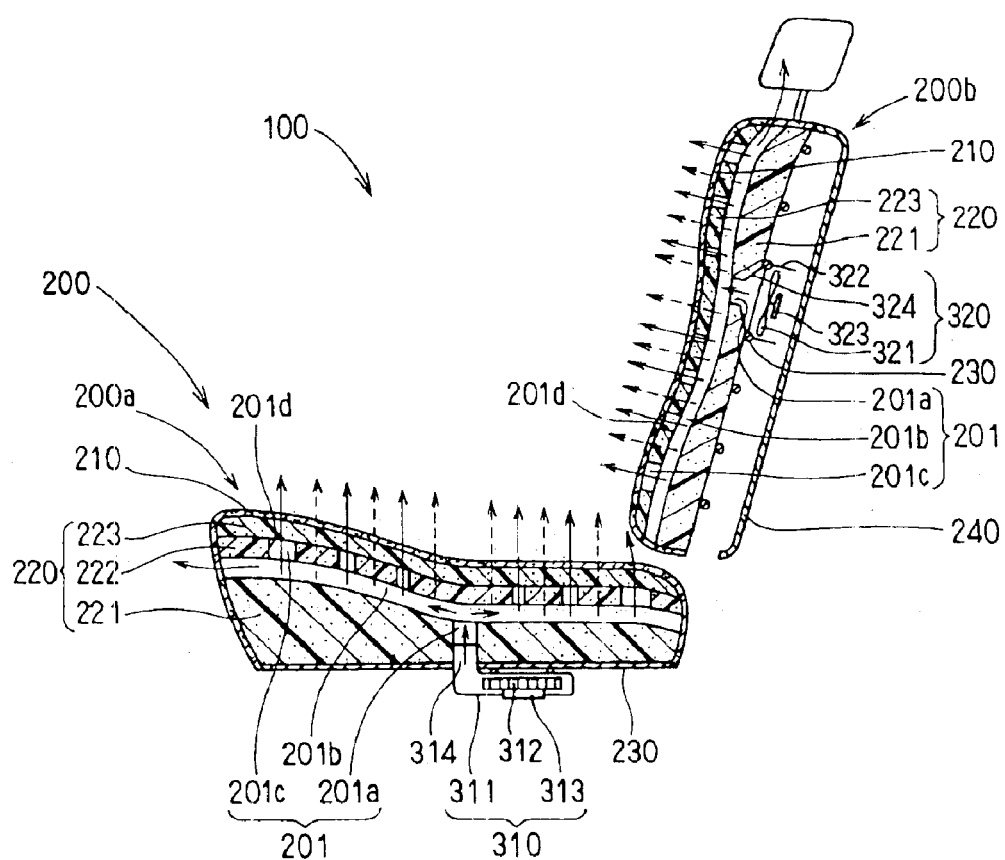
FIG. 1 is a longitudinal cross-sectional view of a seat air conditioning unit for a vehicle according to an embodiment of the present invention.
Figure 2:
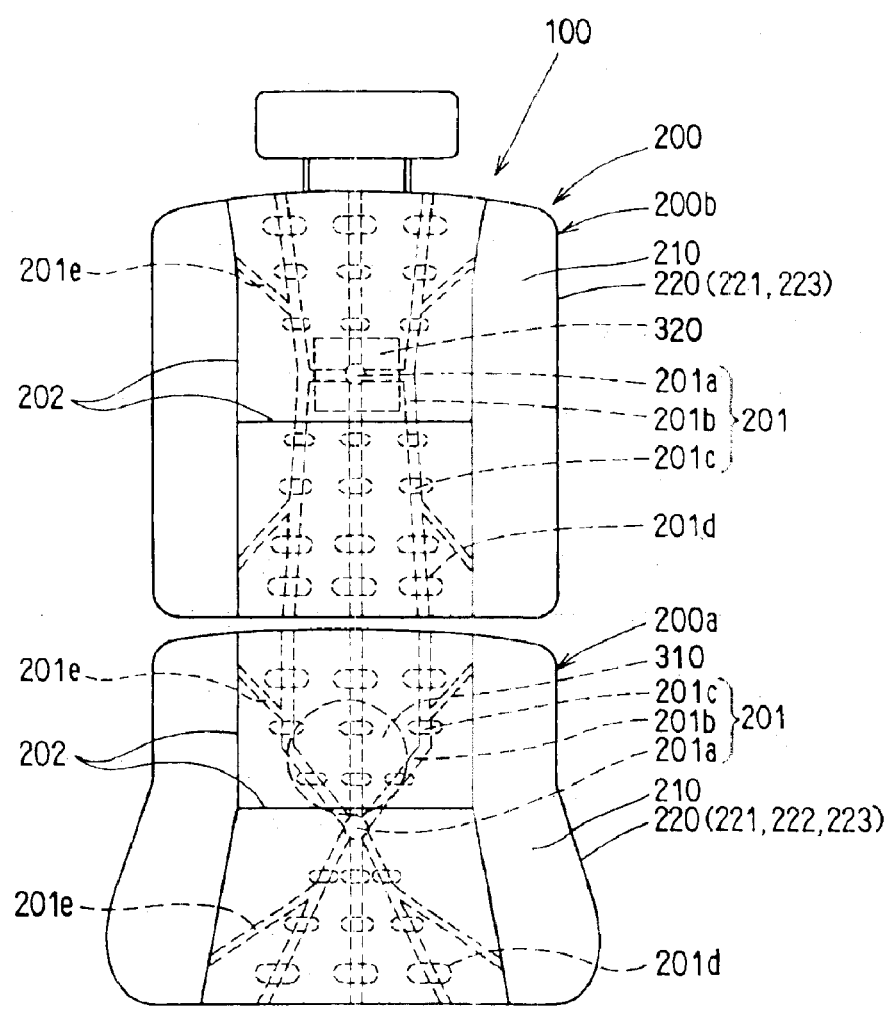
FIG. 2 is a plan view of the seat air conditioning unit for the vehicle according to the embodiment of the present invention.

As shown in FIGS. 1 and 2, a seat air conditioning unit 100 for a vehicle includes a seat 200 and first and second blower units 310, 320. The seat 200 includes a seat cushion (seat bottom) 200a for supporting a seat user's hip and a backrest (seat back) 200b for supporting the user's back. Each of the seat cushion 200a and the backrest 200b has a seat member 220 and a cover (seat surface member) 210 covering the seat member 220.

The cover 210 is used to enhance appearance and texture of the seat 200 and is for example made of fabrics having air permeability. When the fabric, the surface of which is coated with a backing material (e.g. resin) to avoid removal of fibers, is used, foaming process is performed to the backing material to provide air permeability. Alternatively, the cover 200 can be made of non-woven cloth or leather. In this case, a plurality of ventilation holes is formed to provide air permeability.

In the seat cushion 200a, the seat member 220 includes a main pad 221, a placed pad 222 and a cover pad 223. The seat member 220 is supported by a metallic supporting member 230 constructed of a S-spring, stabilizer or the like.

The main pad 221 is to receive the user's weight and is made of polyurethane. The placed pad 222 is to absorb a seating pressure from the user seated thereon and is made of polyurethane as a porous material. The placed pad 222 itself has air communication and air permeability. The cover pad 223 is to ease seating feeling when the user is seated on the seat 200. The cover pad 222 is made of polyester or polyurethane processed by continuous foaming and coat removing. Thus, the cover pad 222 has high air permeability.

The seat member 220 is formed with an air passage 201. The air passage 201 includes an air introduction passage 201a formed within the main pad 221, air distribution passages 201b formed on the surface of the main pad 221, and through holes 201c formed within the placed pad 222.

The air introduction passage 201a is formed substantially at a center of the main pad 221 as a circular hole passing through the main pad 221 in a direction that the thickness of the main pad 221 is measured. The air introduction passage 201a introduces air blown by the blower unit 310 toward the surface of the main pad 221 adjacent to the placed pad 222, that is, into the air distribution passages 201b.

The air distribution passages 201b are provided of grooves that are formed on the surface of the main pad 221 adjacent to the placed pad 222. The grooves diverge from the downstream end of the air introduction passage 201a and substantially linearly extend to the front and rear ends of the seat member 220. The placed pad 222 is placed on the surface of the main pad 221. Therefore, the air distribution passages 201b are formed by the surface of the main pad 221 and the grooves formed on the placed pad 222. Downstream ends of the air distribution passages 201b are open at the front and rear ends of the seat member 220.

The grooves, which construct the air distribution passages 201b, have dimensions to avoid blockings of the air distribution passages 201b by the user's weight. Preferably, each of the grooves has a depth equal to or greater than 15 mm and a width equal to or greater than 10 mm. Here, the depth is 17 mm and the width is 15 mm.

The plurality of through holes 201c is formed in the placed pad 222 at portions corresponding to the air distribution passages 201b to communicate with the air distribution passages 201b. Openings 201d of the through holes 201c on the surface of the placed pad 222 for example have substantially elliptic shapes longitudinal in the left and right direction of the seat, as shown in FIG. 2. A dimension of the opening 201d in the left and right direction of the seat is greater than the width of the air distribution passage 201b. Because air can expand in the left and right direction while passing through the through holes 201c, the through holes 201c improves air conditioning effect.

The opening area or the dimension of the opening 201d gradually increases from the air introduction passage 201a toward a downstream of the air distribution passage 201b. That is, the opening 201d in the downstream position of the air distribution passage 201b is greater than the opening 201d in an upstream position of the air distribution passage 201b, as shown in FIG. 2. Therefore, an air flow resistance is uniformed between downstream positions and upstream positions in the air distribution passages 201b.

In a case that the cover 210 is partially squeezed in grooves formed in the seat member 220 to provide a seat design portion 202, as shown in FIG. 1, the grooves can be used as a part of the air passage 201. Communication passages 201e are formed on the surface of the main pad 221 to communicate the grooves with the air distribution passages 201b, thereby increasing a space of the air passage 201.

The backrest 200b has an air conditioning structure similar to that of the seat cushion 200a. However, the seat member 220 and the second blower unit 320 of the backrest 200b are different from those of the seat cushion 200a. In the backrest 200b, a backboard 240 is provided on a rear side of the seat member 220, as shown in FIG. 1.

The seat member 220 of the backrest 200b does not include the placed pad 222. The seat member 220 includes the main pad 221 and the cover pad 223. The seat member 220 is supported with the support member 230 such as a rod-like spring member. Further, in the backrest 200b, the through holes 201c are formed on the cover pad 223. The through holes 201c have a configuration and arrangement similar to those of the seat cushion 200a, as shown in FIG. 2.

The first and second blower units 310, 320 are provided in the seat bottom 200a and the backrest 200b, respectively. The blower units 310, 320 blow air into the air passage 201. The first blower unit 310, which is provided in the seat bottom 200a, includes a centrifugal fan 312, a scroll casing 311 that houses the centrifugal fan 312 and defines an air passage therein, a motor 313 for rotating the centrifugal fan 312 and a duct 314 for guiding blown air to the air introduction passage 201a. The blower unit 310 is fixed to the support member 230. The duct 314 is connected to the air introduction passage 201a. The centrifugal fan 312 has a pressure characteristic.

The first blower unit 310 is provided under the main pad 221 such that an axis of the centrifugal fan 312 is substantially parallel to a longitudinal direction of the air introduction passage 201a. Also, the axis of the centrifugal fan 312 is located off from an axis of the air introduction passage 201a. This arrangement makes the seat air conditioning unit 100 compact.

Figure 3:
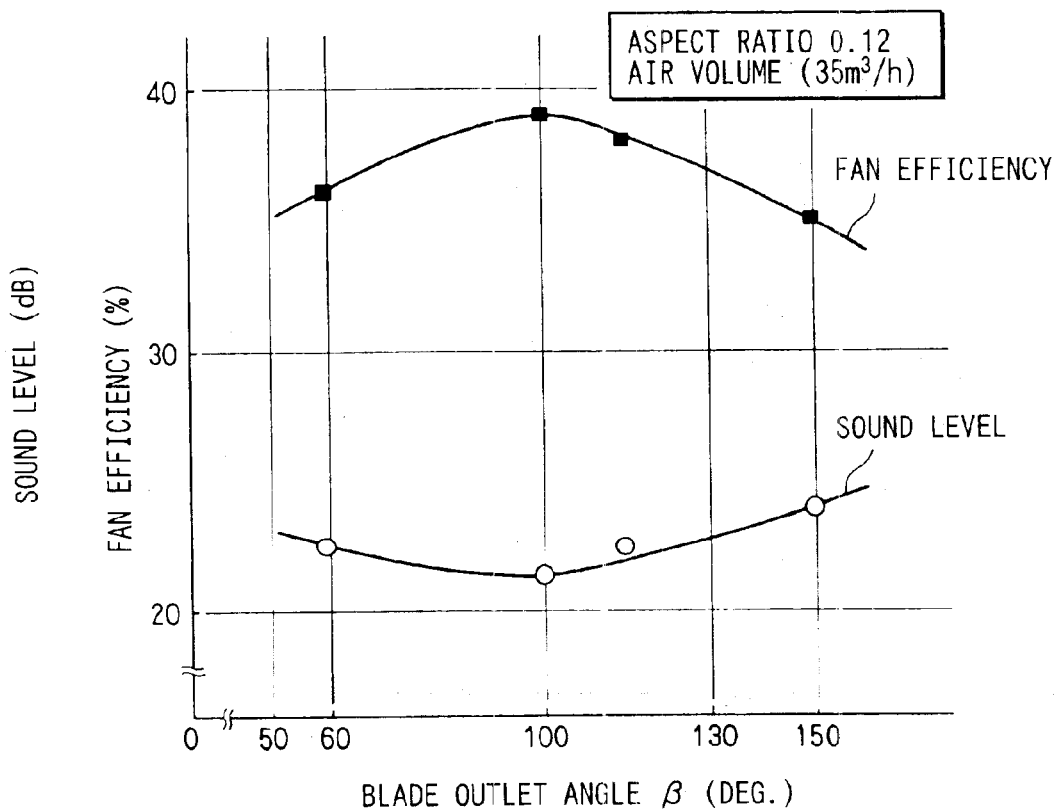
FIG. 3 is a graph for explaining efficiency and a sound level of a centrifugal fan with respect to a blade outlet angle.

The centrifugal fan 312 is flat to improve installation under the seat bottom 200a. That is, the centrifugal fan 312 has a small aspect ratio such that its thickness (height) is small with respect to its diameter. Specifically, the outside diameter of the centrifugal fan 312 is 110 mm and its height is 13.5 mm, so the aspect ratio is 0.12. In this aspect ratio, the centrifugal fan 312 has fan total efficiency and a specific sound level shown in FIG. 3. To optimize the fan total efficiency and specific sound level, a blade outlet angle $\beta$ is in a range of 60 degrees to 130 degrees. Preferably, the blade outlet angle $\beta$ is 100 degrees and a blade inlet angle $\alpha$ is 115 degrees.

Figure 4:
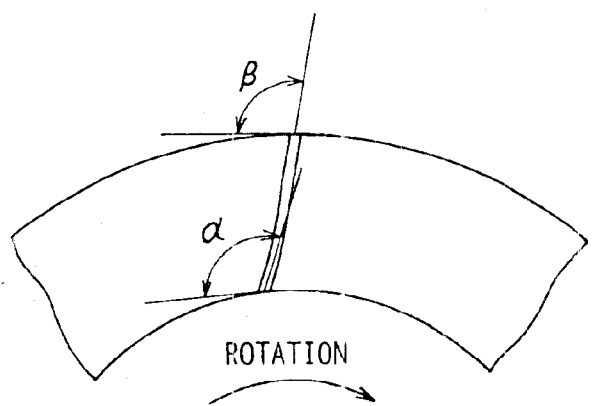
FIG. 4 is an explanatory diagram of the blade outlet angle and a blade inlet angle of the centrifugal fan.

As shown in FIG. 4, the blade outlet angle $\beta$ is defined as a trailing angle, with respect to a direction of rotation, formed by the intersection of a tangent line to an outermost portion of a fan wheel and a tangent line to the blade. The blade inlet angle $\alpha$ is defined as a trailing angle, with respect to the direction of rotation, formed by the intersection of a tangent line to an innermost portion of a fan wheel and a tangent line to the blade.

The second blower unit 320, which is provided to the backrest 200b, includes an axial flow fan 321, a rectangular-shaped shroud 322 that houses the axial flow fan 321 and introduces air, a motor 323 for rotating the axial flow fan 321 and a duct 324 for introducing air into the air introduction passage 201a of the air passage 201. The axial flow fan 321 has an air volume characteristic.

The blower unit 320 is fixed behind the main pad 221 such that the support member 230 is sandwiched between the shroud 322 and the duct 324. The duct 324 is connected to the air introduction passage 201a. Felt (not shown) can be provided on the support member 230 at a portion where the blower unit 320 is fixed, as a shock absorbing material. Further, the blower unit 320 is provided such that an axis of the fan 321 is substantially in consistent with an axis of the air introduction passage 201a. This arrangement makes the seat air conditioning unit 100 compact.

The blower units 310, 320 connect with a general air conditioning unit (not shown) mounted on the vehicle. When the centrifugal fan 312 and the axial flow fan 321 rotate with operation of the motor 313, 323, the blower units 310, 320 draws conditioned air from the air conditioning unit and forcibly blows it into the air passages 201. Alternatively, the blower units 310, 320 can draw conditioned air inside a passenger compartment without connecting with the air conditioning unit. Further, a sheet-like heater having ventilation holes can be provided between the cover 210 and the cover pad 223 to improve heating performance.

Next, operation and advantages of the seat air conditioning unit 100 will be described.

With operation of the blower units 310, 320, conditioned air from the air conditioning unit or inside of the passenger compartment is sucked into the air introduction passages 201a of the seat cushion 200a and the backrest 200b. The air is diverged in the front and rear direction and the top and bottom direction of the seat 200 through the air distribution passages 201b. In the seat cushion 200a, the air passes through the placed pad 222, the cover pad 223 and the cover 210 and blows toward user's hip and thigh, as denoted by dotted-arrows in FIG. 1. In the backrest 200b, the air distributed in the air distribution passages 201b is blown toward the user's waist and back through the cover pad 223, and cover 210, as denoted by dotted-arrows in FIG. 1.

Further, the air expands in the left and right direction of the seat 200 while passing through the through holes 201c, and blows toward the user through the cover 210 as denoted by solid arrows in FIG. 1.

The air blow through the cover 210 is interrupted at a portion where the seating pressure by the user is applied. However, the flow of the air in the air distribution passage 201b improves an air convection and heat transmission toward the user.

Figure 5:
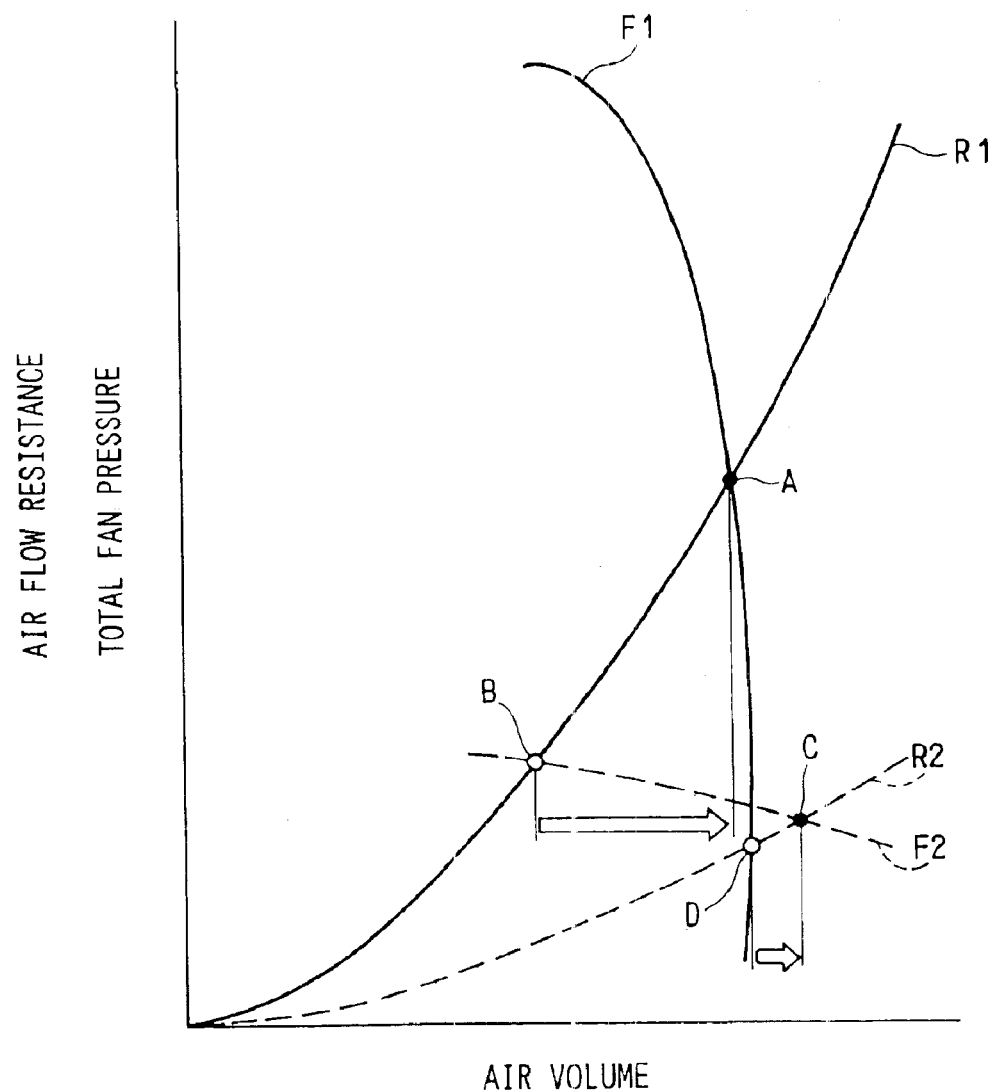
FIG. 5 is a graph for explaining operation efficiency of the centrifugal fan and an axial flow fan with respect to resistances.

In FIG. 5, a solid line R1 denotes an air flow resistance of the air passage 201 of the seat cushion 200a when a seat user sits on the seat 200. Also, a dotted line R2 denotes an air flow resistance of the air passage 201 of the backrest 200b. A solid line F1 denotes a fan pressure of the centrifugal fan 312 and a dotted line F2 denotes a fan pressure of the axial flow fan 321. Generally, the seat cushion 200a receives the seating pressure from the seat user more than the backrest 200b. Thus, the air flow resistance R1 of the seat cushion 200a is higher than the air flow resistance R2 of the backrest 200b, as shown in FIG. 5.

The centrifugal fan 312 has the pressure characteristic and the axial flow fan 321 has the air volume characteristic. Therefore, a gradient of the fan pressure F1 against the air volume is large as compared with a gradient of the fan pressure F2 of the axial flow fan 321. Under the resistance R1, a volume A of air is blown by the centrifugal fan 312 and a volume B of air is blown by the axial flow fan 321. Therefore, in the seat cushion 200a, the centrifugal fan 312 can produce much volume of air than that the axial flow fan 321 produces, under the same input energy (power).

On the other hand, the air flow resistance R2 of the seat bottom 200b is lower than the air flow resistance R1 of the seat cushion 200a. Under the resistance R2, an amount C of air is blown by the axial flow fan 321 and an amount D of air is blown by the centrifugal fan 312. Therefore, in the seat bottom 200b, the axial flow fan 321 produces much volume of air than that the centrifugal fan 312 produces under the same input energy (power).

In this way, air conditioning efficiency is improved by increasing a total air blow amount with saved power. The blade outlet angle β of the centrifugal fan 312 is set in the range of 60 degrees to 130 degrees, in the small aspect ratio. Therefore, the centrifugal fan 312 is used in a condition of maximum fan total efficiency. With this, power required to operation of the centrifugal fan 312 can be reduced. Also, fan sound level can be reduced.

Generally, a thickness of the backrest 200b is small in the vehicle front and rear direction. By employing the axial flow fan 321, the second blower unit 320 can be installed in the backrest 200b.

Since the first blower unit 310 is mounted in a hidden space such as under the seat cushion 200a, a high pressure centrifugal fan, which is relatively large, can be employed.

Further, the blower unit 310 can have a regeneration fan or a mixed flow fan, in place of the centrifugal fan 312.

In the seat cushion 200a, the air introduction passage is formed to pass through the main pad 221 from its bottom surface to its top surface. The air distribution passages 201b are formed substantially horizontally along the top surface of the main pad 221. In the backrest 200b, the air introduction passage is formed to pass through the main pad 221 from its rear surface to the front surface. The air distribution passages 201b are formed along the front surface of the main pad 221 to extend substantially in a top and bottom direction. By the air distribution passages 201b formed along the main pad 221, the conditioned air can be blown off from a wide area of the seat 200.

Although the air flow resistance R1 of the seat cushion 200a is higher than the air flow resistance R2 of the backrest 200b, the conditioned air can be sufficiently supplied into the air passage 201 of the seat cushion 200a by the centrifugal fan 312, or mixed flow fan having pressure characteristic.

Based on the relationships between the air flow resistance and the fan pressure, effective fan combination can be provided.

The present invention should not be limited to the disclosed embodiments, but may be implemented in other ways without departing from the spirit of the invention.

What is claimed is:

1. A seat air conditioning unit for a vehicle comprising:
   a seat including a seat bottom and a backrest, each of which defining an air passage therein through which air flows toward a seat surface;
   a first blower unit provided to the seat bottom for blowing air into the air passage of the seat bottom; and
   a second blower unit provided to the backrest for blowing air into the air passage of the backrest; wherein
   the first blower unit includes one of a centrifugal fan and a regeneration fan, and the second blower unit includes an axial flow fan;
   the seat bottom includes a main pad for supporting a seat user's weight, and the air passage of the seat bottom includes an air introduction passage passing through the main pad from its bottom surface to its top surface and a plurality of air distribution passages formed along the top surface of the main pad, and
   wherein the backrest includes a main pad for supporting the seat user's back, and the air passage of the backrest includes an air introduction passage passing through the main pad from its rear surface to its front surface and a plurality of air distribution passages formed along the front surface of the main pad.

2. The seat air conditioning unit according to claim 1, wherein the first blower unit is provided under the main pad such that an axis of the fan is substantially parallel to an axis of the air introduction passage and is spaced from the axis of the air introduction passage.

3. The seat air conditioning unit according to claim 1, wherein said first blower unit produces a first gradient of fan pressure against air volume and said second blower unit produces a second gradient of fan pressure against air volume, said first gradient being greater than said second gradient.

4. A seat air conditioning unit for a vehicle comprising:
   a seat including a seat bottom and a backrest, each of which defining an air passage therein through which air flows toward a seat surface;
   a first blower unit provided to the seat bottom for blowing air into the air passage of the seat bottom; and
   a second blower unit provided to the backrest for blowing air into the air passage of the backrest; wherein
   the first blower unit includes one of a centrifugal fan, a mixed flow fan and a regeneration fan, and the second blower unit includes an axial flow fan;

the seat bottom includes a main pad for supporting a seat user's weight, and the air passage of the seat bottom includes an air introduction passage passing through the main pad from its bottom surface to its top surface and a plurality of air distribution passages formed along the top surface of the main pad;

the backrest includes a main pad for supporting the seat user's back, and the air passage of the backrest includes an air introduction passage passing through the main pad from its rear surface to its front surface and a plurality of air distribution passages formed along the front surface of the main pad; and the second blower unit is provided behind the main pad of the backrest such that an axis of the axial flow fan is consistent with an axis of the air introduction passage.

5. A seat air conditioning unit for a vehicle comprising:

a seat including a seat bottom and a backrest, each of which defining an air passage therein through which air flows toward a seat surface;

a first blower unit provided to the seat bottom for blowing air into the air passage of the seat bottom; and a second blower unit provided to the backrest for blowing air into the air passage of the backrest; wherein the first blower unit includes one of a centrifugal fan, a mixed flow fan and a regeneration fan, and the second blower unit includes an axial flow fan;

when a seat user is seated on the seat, the air passage of the seat bottom has a first air flow resistance (R1) and the air passage of the backrest has a second air flow resistance (R2); and the first air flow resistance (R1) is greater than the second air flow resistance (R2).

6. The seat air conditioning unit according to claim 5, wherein the axial flow fan blows more volume of air than that the fan of the first blower unit blows, against the second air flow resistance (R2).

7. The seat air conditioning unit according to claim 5, wherein the fan of the first blower unit blows more than the volume of air that the axial flow fan blows, against the first air flow resistance (R1).

8. A seat air conditioning unit for a vehicle comprising:

a seat including a seat bottom and a backrest, each of which defining an air passage therein through which air flows toward a seat surface;

a first blower unit provided to the seat bottom for blowing air into the air passage of the seat bottom; and a second blower unit provided to the backrest for blowing air into the air passage of the backrest; wherein the first blower unit includes a centrifugal fan and the second blower unit includes an axial flow fan; and the fan of the first blower unit has a predetermined aspect ratio so that a dimension along the fan axis is smaller than a fan diameter.

9. The seat air conditioning unit according to claim 8, wherein the fan of the first blower unit has a blade outlet angle in a range of 60 degrees to 130 degrees.

10. The seat air conditioning unit according to claim 8, wherein the fan has the aspect ratio of 0.12.

* * * * *